United States Patent [19]

Issa et al.

[11] Patent Number: 5,801,621
[45] Date of Patent: Sep. 1, 1998

[54] METHOD FOR RE-INITIALIZING VEHICLE PARAMETERS AFTER A POWER LOSS IN A MOTOR VEHICLE

[75] Inventors: Nabil M. Issa, Detroit; Gerald L. Holbrook, Rochester Hills, both of Mich.

[73] Assignee: Chrysler Corporation, Auburn Hills, Mich.

[21] Appl. No.: 503,357

[22] Filed: Jul. 17, 1995

[51] Int. Cl.[6] .................................................. B60Q 1/00
[52] U.S. Cl. .............................. 340/439; 701/35; 701/115
[58] Field of Search .................... 340/439; 364/424.01, 364/424.04, 431.12; 365/228; 701/35, 115

[56] References Cited

U.S. PATENT DOCUMENTS

| | | | |
|---|---|---|---|
| 3,950,737 | 4/1976 | Uchida et al. | 365/228 |
| 4,348,729 | 9/1982 | Sasayama et al. | 365/228 |
| 4,458,307 | 7/1984 | McAnlis et al. | 365/228 |
| 4,630,293 | 12/1986 | Dubuisson et al. | 377/24 |
| 4,651,307 | 3/1987 | Toumayan et al. | 365/228 |
| 4,803,646 | 2/1989 | Burke et al. | 364/561 |
| 4,982,620 | 1/1991 | Holbrook et al. | 74/731.1 |
| 5,278,759 | 1/1994 | Berra et al. | 364/424.01 |
| 5,333,109 | 7/1994 | Oo et al. | 364/424.04 |

*Primary Examiner*—Brent A. Swarthout
*Attorney, Agent, or Firm*—Mark P. Calcaterra

[57] ABSTRACT

A method for reinitializing vehicle parameters stored in a memory of a controller in a motor vehicle after a power loss to the controller includes the steps of determining whether predetermined conditions are right for transferring at least one vehicle parameter stored in a volatile memory of a controller, transferring the vehicle parameter stored in the volatile memory to a non-volatile memory if the predetermined conditions are right for transferring the vehicle parameter, determining whether predetermined conditions are right for re-initializing the vehicle parameter after a power loss to the controller, transferring the vehicle parameter from the non-volatile memory to the volatile memory if the predetermined conditions are right for re-initializing the vehicle parameter, and initializing the vehicle parameter with a predetermined initial value stored in the non-volatile memory to the volatile memory if the predetermined conditions are not right for re-initializing the vehicle parameter.

11 Claims, 2 Drawing Sheets

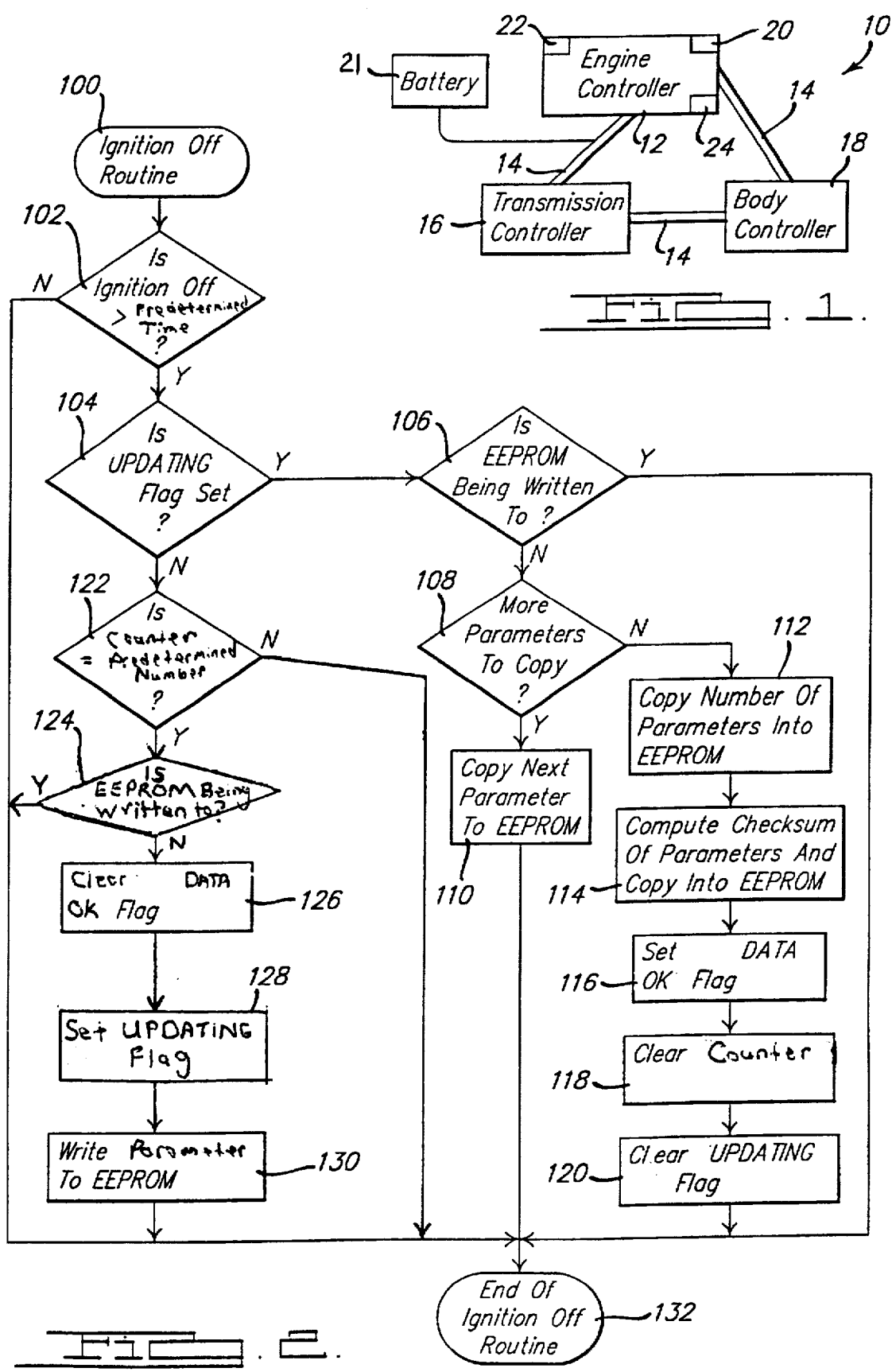

METHOD FOR RE-INITIALIZING VEHICLE PARAMETERS AFTER A POWER LOSS IN A MOTOR VEHICLE

BACKGROUND OF INVENTION

1. Field of the Invention

The present invention relates generally to a method for re-initializing vehicle parameters after a power loss in a motor vehicle and, more particularly, to a method for saving and re-initializing learned vehicle parameters stored within a controller in a motor vehicle after a battery disconnect.

2. Description of the Related Art

Increasing sophistication of motor vehicles has resulted in a proliferation of onboard computers or controllers to control various vehicle operations. For example, the motor vehicle may have an engine controller to control engine related functions, a body controller to control body related functions and likewise a transmission controller to control transmission related functions.

It is common practice within the automotive industry for parameters related to a specific vehicle function to be stored within the controller's memory. Controllers usually have a volatile memory that is backed by a power source such as a battery and a non-volatile memory that protects its contents even after the power has been disconnected. One example of a volatile memory is a random access memory (RAM). One example of a non-volatile memory is a read only memory (ROM). Another commonly used non-volatile memory is an electrically erasable programmable read only memory (EEPROM).

Learned vehicle parameters are commonly stored in RAM. A learned vehicle parameter is a parameter provided with an initial value that is subsequently updated and adjusted according to a particular vehicle operating condition, i.e. learned. When that particular vehicle operating condition is encountered another time, the previously learned value is utilized. However, a problem may occur, when the battery of the vehicle is disconnected, or if the battery's power has been drained, because information stored in RAM is lost.

In the case of learned vehicle parameters, after the power to the battery is regained, the initial value of the parameter originally stored in ROM is used and the learning process begins again. This could result in customer dissatisfaction. For example, if the customer takes the vehicle in to have an audio component such as the radio repaired, and the battery is disconnected as part of the repair procedure, the customer leaves with the radio fixed, but now the transmission shift quality may be degraded until the learned parameters are relearned.

SUMMARY OF THE INVENTION

It is, therefore, one object of the present invention to provide a method for re-initializing vehicle parameters after a power loss in a motor vehicle.

It is another object of the present invention to provide a method for saving and re-initializing learned vehicle parameters stored within a controller in a motor vehicle after a battery of the motor vehicle has been disconnected or drained.

It is yet another object of the present invention to provide a method for periodically copying learned vehicle parameters stored in a volatile memory to a non-volatile memory, and to transfer the learned vehicle parameters from the non-volatile memory to volatile memory after the battery of the motor vehicle has been disconnected or drained of power.

It is still a further object of the present invention to provide a method for determining the validity of the vehicle parameters before transferring them from non-volatile memory to volatile memory.

To achieve the forgoing objects, the present invention is a method for re-initializing vehicle parameters stored in memory of a controller in a motor vehicle after a power loss to the controller. The method includes the steps of determining whether predetermined conditions are right for transferring at least one vehicle parameter stored in a volatile memory of a controller and transferring the vehicle parameter stored in the volatile memory to a non-volatile memory of the controller if the predetermined conditions are right for transferring the vehicle parameter. The method also includes the steps of determining whether predetermined conditions are right for re-initializing the vehicle parameter after a power loss to the controller and transferring the vehicle parameter from the non-volatile memory to the volatile memory if the predetermined conditions are right for re-initializing the vehicle parameter and initializing the vehicle parameter with a predetermined initial value stored in the non-volatile memory to the volatile memory if the predetermined conditions are not right for re-initializing the vehicle parameter.

One advantage of the present invention is that a method is provided for re-initializing vehicle parameters after a power loss in a motor vehicle. Another advantage of the present invention is that a method is provided for periodically storing vehicle parameters in a non-volatile memory of a controller in the motor vehicle. A further advantage of the present invention is that a method is provided for copying the information stored in a non-volatile memory back to a volatile memory after a power loss for the controller. Still another advantage of the present invention is that the method checks the validity of the information stored in non-volatile memory before it is transferred. Yet another advantage of the present invention is that the method re-initializes learned vehicle parameters after the battery of the motor vehicle is disconnected or the battery drained.

Other objects, features and advantages of the present invention will be readily appreciated as the same becomes better understood after reading the following description taken in conjunction with the accompanying drawings.

BRIEF DESCRIPTION OF THE DRAWINGS

FIG. 1 is a schematic view illustrating controllers and a battery in a motor vehicle.

FIGS. 2 through 4 are flowcharts of a method, according to the present invention, a for re-initializing vehicle parameters for the controllers of FIG. 1 after a power loss of the battery.

DESCRIPTION OF THE PREFERRED EMBODIMENT(S)

Figures 3, 4:
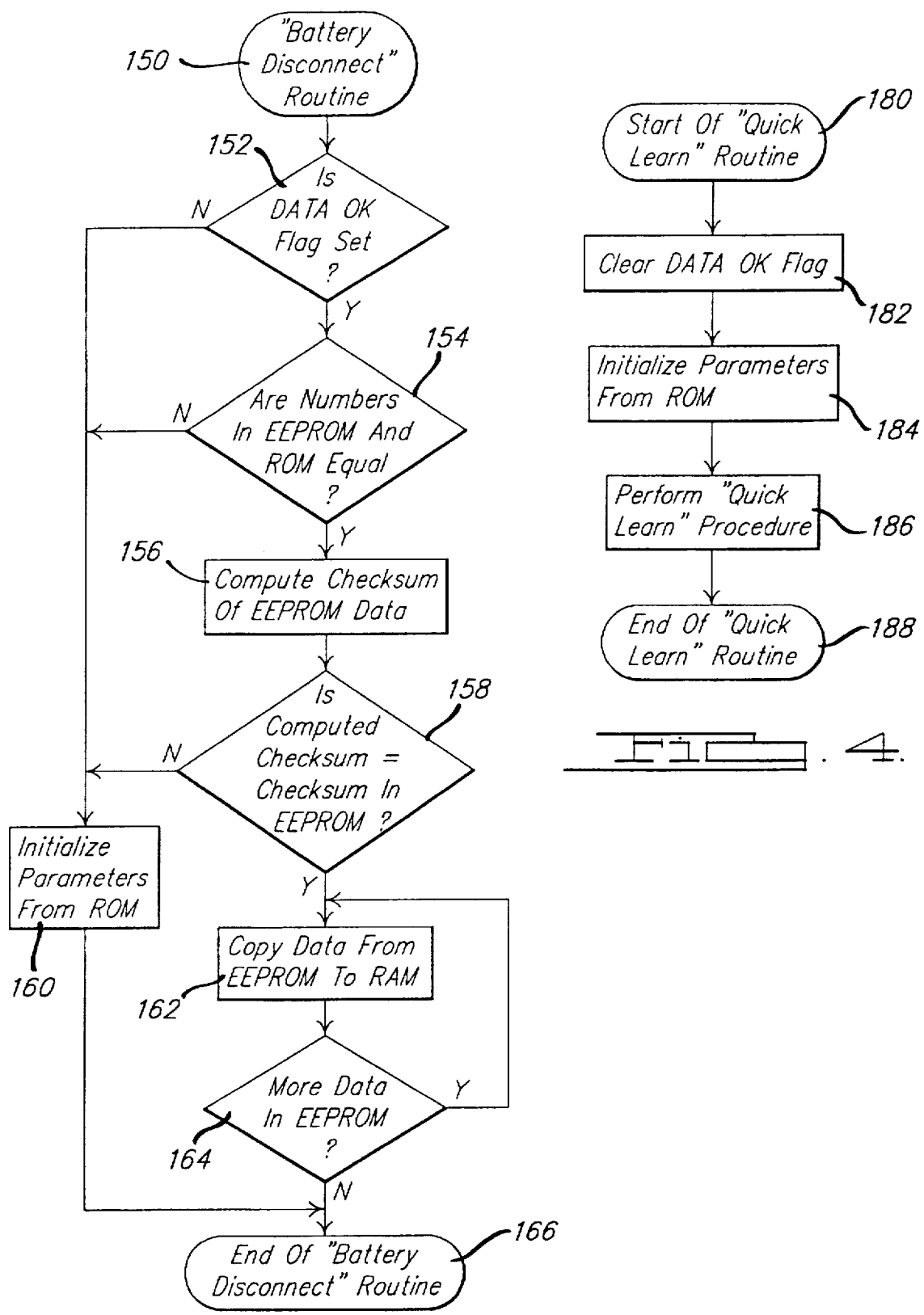

Referring to FIG. 1, a motor vehicle 10 includes a plurality of controllers illustrated schematically. The controllers are microprocessor based computers commonly used in the automotive industry to provide a variety of functions. Most motor vehicles have at least one controller, typically an engine controller. In one embodiment, the motor vehicle 10 includes controllers such as an engine controller 12 for engine related functions in communication through a serial communications bus 14 with a transmission controller 16 for transmission related activities and a body controller 18 for interior convenience related functions. It should be appreciated that the controllers 12, 16 and 18 are in communication with each other through the communications bus 14 and are known in the art.

Each controller 12, 16 and 18 includes at least at least one memory. There may be several types of memory within each controller 12, 16, 18, including a volatile memory 20 that is backed by a power source such as a battery 21 to be described. In this example, the volatile memory 20 is a random access memory (RAM). Each controller 12, 16 and 18 may include another type of memory such as a non-volatile memory 22. In this example, the non-volatile memory is an electrically erasable programmable read only memory (EEPROM). A common feature of the non-volatile memory 22 is that it maintains its contents even if the battery 21 is disconnected. Each controller 12, 16, 18 may include another non-volatile memory such as a read only memory (ROM) 24 that can be read from, but not written to or programmed. It should be appreciated that the above are examples of memory types, and that other memory types with similar features could be utilized. It should also be appreciated that if battery 21 is disconnected or drained of power, the information stored in volatile memory 20 is lost.

Referring to FIGS. 2 through 4, flowcharts of a method, according to the present invention, for reinitializing vehicle parameters after a power loss in the motor vehicle 10 is shown. The method takes place within the controller 12, 16 and 18 and is called for periodically. The method can be performed while the motor vehicle 10 is running, or after the ignition has been turned OFF. In this example, the method is called for after the ignition has been turned OFF. It should be appreciated that it is common for the controller 12, 16, and 18 to function for a short period after the ignition has been turned OFF.

As illustrated in FIG. 2, the methodology begins in bubble 100 after being called for by the controller 12, 16, 18 and continues to diamond 102. In diamond 102, the methodology determines whether the ignition has been off for at least a predetermined period of time. For this example, the time period is two seconds, although it could be more or less. If the ignition has not been off for the predetermined period of time, the methodology branches to bubble 132 to be described. If the ignition has been off greater than the predetermined period of time, the methodology advances to diamond 104.

In diamond 104, the methodology determines whether an updating flag is set, indicating that updating the non-volatile memory 22 has been initiated (i.e., in progress). If the updating flag is set, the methodology advances to diamond 106. In diamond 106, the methodology determines whether the non-volatile memory 22 is currently being written to based on a busy flag. If the non-volatile memory 22 is currently being written to, the methodology branches to bubble 132 to be described. If the non-volatile memory 22 is not currently being written to, the methodology advances to diamond 108 and determines whether there are more vehicle parameters to copy or transfer based on a comparison of the last RAM address saved against the end address of the learned vehicle parameters. If there are more vehicle parameters to be copied, the methodology advances to block 110 and copies the next vehicle parameter to the non-volatile memory 22. The methodology then advances to bubble 132 to be described.

Returning back to diamond 108, if there are not any more vehicle parameters to copy, the methodology advances to block 112. In block 112, the methodology writes the number of vehicle parameters that were copied or transferred into the non-volatile memory 22 to the non-volatile memory 22. The methodology then advances to block 114 and calculates and writes a checksum of the vehicle parameters to the non-volatile memory 22. The methodology then advances to block 116 and sets a data OK flag indicating that the data is correct. The methodology then advances to block 118 and clears a counter, indicating a number of engine starts, to zero (0). In this example, the vehicle parameters are copied once for every predetermined number of engine starts, e.g., the vehicle parameters are copied after every eighth engine start. The methodology then advances to block 120 and clears the updating flag. The methodology then advances to bubble 132 to be described. It should be appreciated that the vehicle parameters could be copied after every engine start.

Returning back to diamond 104, if the updating flag is not set, the methodology advances to diamond 122. In diamond 122, the methodology determines whether the counter, indicating a number of engine starts is equal to a predetermined number, depending on how often it is desired that data be transferred. For this example, the predetermined number was set that the data be transferred after every eighth engine start. If the counter equals the predetermined number, the methodology advances to diamond 124 and determines whether the non-volatile memory 22 is being written to. If the non-volatile memory 22 is being written to, the methodology advances to bubble 132 to be described. If the non-volatile memory 22 is not being written to, the methodology advances to block 126 and clears a data OK flag, indicating that the vehicles parameters have been transferred. After block 126, the methodology advances to block 128 and sets an updating flag indicating that vehicle parameters should be transferred on the next iteration of the method. From block 128, the methodology advances to block 130 and writes or transfers a vehicle parameter to the non-volatile memory 22. The methodology then advances to bubble 132 and ends an end of ignition OFF routine.

Returning to diamond 122, if the counter does not equal the predetermined number, the methodology advances to bubble 132 previously described. It should be appreciated that the counter is updated or incremented once per power up or ignition ON.

As illustrated in FIG. 3, the methodology copies vehicle parameters from the non-volatile memory 22 to the volatile memory 20 after a power loss of the battery 21. The methodology is called for by the controller 12, 16 and 18 after it has been determined that there has been a power loss, such as when the battery 21 is disconnected. The controller 12, 16 and 18 determines that there has been a power loss when a sum of all checksum memory is not equal to a predetermined checksum area. Once this has occurred, the methodology begins at bubble 150 and advances to diamond 152.

In diamond 152, the methodology determines whether the data OK flag, previously described, is set. If the data OK flag is not set, the methodology advances to block 160. In block 160, the methodology initializes the vehicle parameters with values previously stored in the read only memory 24. The methodology then advances to bubble 166 to be described.

In diamond 152, if the data OK flag is set, the methodology advances to diamond 154 and checks the validity of the data or vehicle parameters transferred to the non-volatile memory 22. The methodology determines whether the predetermined number of the vehicle parameters stored in the non-volatile memory 22 is equal to the predetermined number of the vehicle parameters stored in the read only memory 24. If the predetermined numbers are not equal, the methodology advances to block 160 previously described. If the predetermined numbers are equal, the methodology advances to block 156 and checks the validity of the data or vehicle parameters by computing or calculating a checksum of the vehicle parameters stored in the non-volatile memory 22. The methodology then advances to diamond 158 and determines whether the computed checksum is equal to a checksum previously calculated and stored in the non-volatile memory 22. If the computed checksum is not equal to the stored checksum, the methodology advances to block 160 previously described.

If the computed checksum is equal to the stored checksum, the methodology advances to block 162. In block 162, the methodology copies or transfers data or the vehicle parameter from the non-volatile memory 22 to volatile memory 20. The methodology advances to diamond 164 and determines if there is more data or vehicle parameters in the non-volatile memory 22 to be copied based on the number copied to the non-volatile memory 22, which was previously saved in the non-volatile memory 22. If there is more data or vehicle parameters to be copied, the methodology returns to block 162 previously described. If there is not more data to be copied, the methodology advances to bubble 166. In bubble 166, the methodology ends an end of battery disconnect routine.

Referring to FIG. 4, the methodology is illustrated for overriding the transfer of data stored in the non-volatile memory 22 after the power has been disconnected and certain hardware has been replaced. For example, in a case of a transmission system (not shown) and transmission controller 16, the battery 21 would be disconnected when replacing the transmission. The previously learned vehicle parameters for shift patterns would not be appropriate for the new transmission, and it is necessary to use the initial values stored in the read only memory 24 until the new transmission has learned new parameters. Since the transmission controller 16 will sense that the battery 21 has been disconnected, a routine for bypassing transfer of data may be required.

The methodology is called for in bubble 180 by a externally programmable controller in communication with the transmission controller 16. For example, the hand-held Chrysler DRB II system is one example of a externally programmable controller. It is foreseeable that other types of devices capable of programming a controller could be utilized. From bubble 180, the methodology advances to block 182 and clears the data OK flag previously described. The methodology proceeds to block 184 and initializes vehicle parameters with values previously stored in the read only memory 24. After block 184, the methodology then proceeds to block 186 which performs a "quick learn" procedure that learns the vehicle parameters. The methodology then proceeds to block 188 and ends an end of quick learn routine.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method for reinitializing vehicle parameters stored in memory of a controller in a motor vehicle after a power loss to the controller, said method comprising the steps of:

determining whether predetermined conditions are right for transferring, at least one vehicle parameter stored in a volatile memory of a controller;

transferring the vehicle parameter stored in the volatile memory to a non-volatile memory of the controller if the predetermined conditions are right for transferring the vehicle parameter;

determining whether predetermined conditions are right for re-initializing the vehicle parameter after a power loss to the controller;

performing a validity check of the vehicle parameter stored in the non-volatile memory by determining whether a predetermined number of vehicle parameters stored in the non-volatile memory is equal to a predetermined number of vehicle parameters stored in a read only memory;

transferring the vehicle parameter from the non-volatile memory to the volatile memory if the predetermined conditions are right for re-initializing the vehicle parameter and the validity check is valid; and initializing the vehicle parameter with a predetermined initial value stored in the non-volatile memory to the volatile memory if the predetermined conditions are not right for re-initializing the vehicle parameter and the validity check is not valid.

2. A method as set forth in claim 1 wherein said step of determining if the predetermined conditions are right for transferring a vehicle parameter comprises:

determining if the ignition is OFF at least a predetermined period of time; and continuing said method if the ignition has been OFF at least the predetermined period of time.

3. A method as set forth in claim 2 wherein said step of determining whether the predetermined conditions are right for transferring the vehicle parameter further comprises determining whether the non-volatile memory needs updating.

4. A method for reinitializing vehicle parameters stored in memory of a controller in a motor vehicle after a power loss to the controller, said method comprising the steps of:

determining whether predetermined conditions are right for transferring at least one vehicle parameter stored in a volatile memory of a controller;

transferring the vehicle parameter stored in the volatile memory to a non-volatile memory of the controller if the predetermined conditions are right for transferring the vehicle parameter;

determining whether predetermined conditions are right for re-initializing the vehicle parameter after a power loss to the controller;

transferring the vehicle parameter from the non-volatile memory to the volatile memory if the predetermined conditions are right for re-initializing the vehicle parameter;

initializing the vehicle parameter with a predetermined initial value stored in the non-volatile memory to the volatile memory if the predetermined conditions are not right for re-initializing the vehicle parameter;

wherein said step of determining whether the predetermined conditions are right for transferring comprises:

determining if the ignition is OFF at least a predetermined period of time;

continuing said method if the ignition has been OFF at least the predetermined period of time;

determining whether the non-volatile memory needs updating;

checking if a counter equals a predetermined number if the non-volatile memory does not need updating;

updating the counter if the counter does not equal the predetermined number; and determining whether the non-volatile memory is currently being written to if the counter does equal the predetermined number.

5. A method as set forth in claim 4 including the steps of writing the vehicle parameter into the non-volatile memory.

6. A method as set forth in claim 4 including the step of determining whether more vehicle parameters are to be transferred into the non-volatile memory if the non-volatile memory needs updating.

7. A method as set forth in claim 6 including the step of transferring more vehicle parameters to the non-volatile memory if more vehicle parameters are to be transferred into the non-volatile memory.

8. A method for reinitializing vehicle parameters stored in memory of a controller in a motor vehicle after a power loss to the controller, said method comprising the steps of:

determining whether predetermined conditions are right for transferring, at least one vehicle parameter stored in a volatile memory of a controller;

transferring the vehicle parameter stored in the volatile memory to a non-volatile memory of the controller if the predetermined conditions are right for transferring the vehicle parameter;

determining whether predetermined conditions are right for re-initializing the vehicle parameter after a power loss to the controller;

transferring the vehicle parameter from the non-volatile memory to the volatile memory if the predetermined conditions are right for re-initializing the vehicle parameter;

initializing the vehicle parameter with a predetermined initial value stored in the non-volatile memory to the volatile memory if the predetermined conditions are not right for re-initializing the vehicle parameter; and performing a validity check of the vehicle parameters by determining if a number of vehicle parameters stored in the non-volatile memory is equal to a predetermined number stored in the non-volatile memory prior to said step of transferring.

9. A method for reinitializing vehicle parameters stored in memory of a controller in a motor vehicle after a power loss to the controller, said method comprising the steps of:

determining whether predetermined conditions are right for copying at least one vehicle parameter stored in a volatile memory of a controller;

checking whether a non-volatile memory of the controller is ready for updating if the predetermined conditions are right for copying the vehicle parameter;

copying at least one vehicle parameter stored in the volatile memory to the non-volatile memory if the non-volatile memory is ready for updating;

during a next start-up of the vehicle, checking if the power was disconnected to the controller;

performing a validity check of the vehicle parameter stored in the non-volatile memory by determining if a number of vehicle parameters stored in the non-volatile memory is equal to a predetermined number stored in the non-volatile memory;

copying vehicle parameters into random access memory from non-volatile memory if the validity check is positive; and copying initial values for vehicle parameters from a read only memory to the volatile memory if the validity check is negative.

10. A method for reinitializing vehicle parameters stored in memory of a controller in a motor vehicle after a power loss to the controller, said method comprising the steps of:

determining whether predetermined conditions are right for transferring, at least one vehicle parameter stored in a volatile memory of a controller;

transferring the vehicle parameter stored in the volatile memory to a non-volatile memory of the controller after a predetermined number of engine starts if the predetermined conditions are right for transferring the vehicle parameter;

determining whether predetermined conditions are right for re-initializing the vehicle parameter after a power loss to the controller;

performing a validity check of the vehicle parameter stored in the non-volatile memory by determining whether a predetermined number of vehicle parameters stored in the non-volatile memory is equal to a predetermined number of vehicle parameters stored in a read only memory;

transferring the vehicle parameter from the non-volatile memory to the volatile memory if the predetermined conditions are right for re-initializing the vehicle parameter and the validity check is valid; and initializing the vehicle parameter with a predetermined initial value stored in the non-volatile memory to the volatile memory if the predetermined conditions are not right for re-initializing the vehicle parameter and the validity check is not valid.

11. A method for reinitializing vehicle parameters stored in memory of a controller in a motor vehicle after a power loss to the controller, said method comprising the steps of:

determining whether predetermined conditions are right for transferring a plurality of vehicle parameters stored in a volatile memory of a controller;

transferring the vehicle parameters stored in the volatile memory to a non-volatile memory of the controller if the predetermined conditions are right for transferring the vehicle parameters;

determining whether predetermined conditions are right for re-initializing the vehicle parameters after a power loss to the controller;

performing a validity check of the vehicle parameters stored in the non-volatile memory by calculating a checksum of the vehicle parameters stored in the non-volatile memory;

transferring the vehicle parameters from the non-volatile memory to the volatile memory if the predetermined conditions are right for re-initializing the vehicle parameters and the validity check is valid; and initializing the vehicle parameters with a predetermined initial value stored in the non-volatile memory to the volatile memory if the predetermined conditions are not right for re-initializing the vehicle parameters and the validity check is not valid.

* * * * *